(12) United States Patent
Overhoff et al.

(10) Patent No.: US 9,719,395 B2
(45) Date of Patent: Aug. 1, 2017

(54) COMPONENT CARRIER FOR A DOSING SYSTEM

(71) Applicants: Werner Overhoff, Marl (DE); Armin Kassel, Hagen (DE)

(72) Inventors: Werner Overhoff, Marl (DE); Armin Kassel, Hagen (DE)

(73) Assignee: Albonair GmbH, Dortmund (DE)

( * ) Notice: Subject to any disclaimer, the term of this patent is extended or adjusted under 35 U.S.C. 154(b) by 0 days.

(21) Appl. No.: 14/527,737

(22) Filed: Oct. 29, 2014

(65) Prior Publication Data

US 2015/0047327 A1 Feb. 19, 2015

Related U.S. Application Data

(63) Continuation-in-part of application No. 13/128,491, filed on May 10, 2011, now Pat. No. 8,984,862.

(51) Int. Cl.
*F01N 3/00* (2006.01)
*F01N 3/10* (2006.01)
*F01N 3/20* (2006.01)

(52) U.S. Cl.
CPC .......... *F01N 3/208* (2013.01); *F01N 2610/02* (2013.01); *F01N 2610/085* (2013.01); *F01N 2610/10* (2013.01); *Y02T 10/24* (2013.01)

(58) Field of Classification Search
CPC ........... F01N 2610/02; F01N 2610/085; F01N 2610/10; F01N 3/208; Y02T 10/24

(Continued)

(56) References Cited

U.S. PATENT DOCUMENTS 5,605,042 A 2/1997 Stutzenberger
5,884,475 A * 3/1999 Hofmann .......... B01D 53/9431
60/274

(Continued)

FOREIGN PATENT DOCUMENTS

DE 1 775 434 7/1971
DE 44 38 093 C1 3/1996

(Continued)

OTHER PUBLICATIONS

Novelty Search Report issued by German Patent Office regarding Application No. 10 1008 057 258.6.

*Primary Examiner* — Phutthiwat Wongwian
*Assistant Examiner* — Diem Tran
(74) *Attorney, Agent, or Firm* — Law Offices of Robert F. Zielinski, LLC

(57) ABSTRACT

A component carrier of a dosing system including a plurality of components for injecting a urea solution into the exhaust gas flow of an internal combustion engine comprises a base plate forming the component carrier, a plurality of inner flow channels integrated into the base plate, and an inlet port and an outlet port connecting the inner flow channels with the coolant circuit of the internal combustion engine. The component carrier is heated by flowing a fluid having an elevated temperature and circulating in the coolant circuit from the inlet port to the outlet port passing through the inner flow channels and transferring the heat from the fluid to the component carrier. The components of the dosing system mounted on the component carrier and in thermal contact with the component carrier are heated by heat transfer from the heated component carrier.

20 Claims, 3 Drawing Sheets

(58) Field of Classification Search
USPC .................................. 60/286, 298, 301, 303
See application file for complete search history.

(56) References Cited

U.S. PATENT DOCUMENTS

| | | | |
|---|---|---|---|
| 6,192,677 B1 | 2/2001 | Tost | |
| 6,279,546 B1 * | 8/2001 | Nakase | F02M 37/20 123/509 |
| 6,513,323 B1 | 2/2003 | Weigl et al. | |
| 6,539,708 B1 | 4/2003 | Hofmann et al. | |
| 7,647,767 B2 | 1/2010 | Osaku et al. | |
| 7,775,036 B2 * | 8/2010 | Barcin | B01D 53/79 60/274 |
| 8,459,013 B2 * | 6/2013 | Hosaka | F01N 3/2066 220/562 |
| 9,057,304 B2 * | 6/2015 | Huthwohl | F01N 3/2066 |
| 2008/0092531 A1 | 4/2008 | Suzuki et al. | |
| 2009/0071132 A1 | 3/2009 | Schmelter et al. | |

FOREIGN PATENT DOCUMENTS

| | | |
|---|---|---|
| DE | 44 38 397 A1 | 4/1996 |
| DE | 297 08 591 U1 | 7/1997 |
| DE | 199 19 426 C1 | 3/2000 |
| DE | 20 2005 019 499 U1 | 3/2006 |
| DE | 10 2005 031 510 A1 | 1/2007 |
| DE | 10 2006 017 414 A1 | 10/2007 |
| EP | 1 662 103 A1 | 5/2006 |
| EP | 1 712 754 A1 | 10/2006 |

* cited by examiner

COMPONENT CARRIER FOR A DOSING SYSTEM

CROSS-REFERENCE TO RELATED APPLICATIONS

The present patent application is based on is a continuation-in-part of U.S. patent application Ser. No. 13/128,491, filed on May 10, 2011, which claims the 371 benefit of priority of PCT/EP2009/006389 Sep. 3, 2009, the entireties of which are hereby incorporated by reference.

The invention relates to a component carrier of a dosing system for injecting a urea solution into the exhaust gas flow of an internal combustion engine for selective catalytic reduction, the dosing system being connected/connectable to a urea tank from which urea solution can be taken, and the dosing system being connected/connectable to a compressed air supply, the dosing system having a pump for delivering the urea solution and the dosing system having at least one nozzle through which the urea solution can be injected into the exhaust gas flow by means of compressed air.

So-called SCR catalytic converters are used to reduce the nitrogen oxide emission of diesel engines. For this purpose a reducing agent is injected into the exhaust gas system with a dosing device. Ammonia is used as the reducing agent.

Since the carrying of ammonia in motor vehicles is a safety issue, urea is used in aqueous solution with conventionally 32.5% urea proportion, especially according to DIN 70070. In the exhaust gas the urea decomposes at temperatures above 150° Celsius into gaseous ammonia and $CO_2$. The parameters for the decomposition of the urea are essentially time (vaporization and reaction time), temperature and the droplet size of the injected urea solution. In these SCR catalytic converters selective catalytic reduction (SCR) reduces the emission of nitrogen oxides by roughly 90%. The urea solution used according to DIN 70070 is also labeled so-called AdBlue.

The urea solution is dosed by means of a dosing system, injected into the exhaust gas flow and provides for the desired chemical reaction in the SCR catalytic converter. In this connection the nitrogen oxides are converted into nitrogen and water vapor.

The urea solution freezes at −11° C. In order to ensure operation of the dosing system for injection of a urea solution such as AdBlue into the exhaust gas even below this temperature, the system components must be heated. Electrical resistance elements are used for this purpose.

The disadvantage here is that electrical energy is needed for heating. Furthermore it is disadvantageous that the dosing system becomes very complex and expensive since a host of different components must be heated with a correspondingly large number of electrical heating elements.

The object of the invention is to make available a dosing system in which heating of the system components is possible and at the same time the system-engineering cost is reduced and the dosing system has a simple structure.

This object is achieved as claimed in the invention by a component carrier for a dosing system as claimed in claim 1, by a dosing system for injection of a urea solution as claimed in claim 12 and by an arrangement as claimed in claim 13. Advantageous configurations of the invention are given in the dependent claims.

In the component carrier of a dosing system for injection of a urea solution into the exhaust gas flow of an internal combustion engine for selective catalytic reduction, the dosing system being connected/connectable to a urea tank from which the urea solution can be taken, and the dosing system being connected/connectable to a compressed air supply, the dosing system having a pump for delivering the urea solution and the dosing system having at least one nozzle through which the urea solution can be injected into the exhaust gas flow by means of compressed air, it is especially advantageous that the components of the dosing system are mounted/can be mounted in thermal contact with the component carrier on the component carrier and the component carrier has at least one contact region for producing thermal contact with a fluid with a higher temperature, especially with the coolant circuit of the internal combustion engine so that the component carrier forms/can form a heat sink and is heated/can be heated so that the components which are mounted/can be mounted on the component carrier are heated/can be heated.

The components of the dosing system which are mounted/can be mounted on the component carrier can be the pump and/or a urea solution line and/or a compressed air line and/or valves such as control valve(s) and/or nonreturn valve(s) and/or ports.

In the dosing system for injection of a urea solution into the exhaust gas flow of an internal combustion engine for selective catalytic reduction, the dosing system being connected/connectable to a urea tank from which urea solution can be taken, and the dosing system being connected/connectable to a compressed air supply, the dosing system having a pump for delivering the urea solution and the dosing system having at least one nozzle through which the urea solution can be injected into the exhaust gas flow by means of compressed air, it is especially advantageous that the dosing system has a component carrier as claimed in the invention and components of the dosing system, especially the pump and/or a urea solution line and/or a compressed air line and/or valves and/or ports are mounted in thermal contact with the component carrier on the component carrier, the component carrier being in thermal contact with a coolant circuit of the internal combustion engine.

In the arrangement of a component carrier of a dosing system for injection of a urea solution into the exhaust gas flow of an internal combustion engine for selective catalytic reduction, the dosing system being connected to a urea tank from which urea solution can be taken, and the dosing system being connected to a compressed air supply, the dosing system having a pump for delivering the urea solution and the dosing system having at least one nozzle through which the urea solution can be injected into the exhaust gas flow by means of compressed air, it is especially advantageous that components of the dosing system, especially the pump and/or a urea solution line and/or a compressed air line and/or valves and/or ports are mounted in thermal contact with the component carrier on the latter, the component carrier being thermally in contact with a coolant circuit of the internal combustion engine and forming a heat sink of the coolant circuit.

Thermal contact here means that a heat-conducting contact is formed which enables heat transfer. The component carrier is thus incorporated into the coolant circuit of the internal combustion engine in terms of heat engineering so that exhaust heat of the internal combustion engine is transferred via its coolant to the component carrier and via the component carrier to different components of the dosing system so that these components are heated by means of the exhaust heat of the internal combustion engine. The component carrier thus forms a heat sink in the coolant circuit of the internal combustion engine.

That components can be mounted/are mounted on the component carrier does not mean by limitation that they are arranged in a certain position relative to the component carrier, for example vertically above the component carrier, but rather that the components are mounted/can be mounted in any position relative to the component carrier on the latter and heat transfer from the component carrier to the components or vice versa is possible. It is thus also possible to transfer the exhaust heat of the delivery pump via the component carrier to other components.

In this way, an arrangement and the heating of the components of a dosing system for injecting a urea solution into the exhaust gas flow of an internal combustion engine for selective catalytic reduction on a common base plate are easily possible, in particular premounting on the dosing system can take place so that it can be mounted as a complete module, mounted on the component carrier.

Preferably the contact region of the component carrier is formed by at least one recess and/or receiver into which a line which heats the component carrier is inserted/can be inserted, the line carrying a fluid with elevated temperature so that the component carrier can form/forms a heat sink.

Preferably the component carrier has several grooves and/or receivers which are located on the outside and into which lines are inserted/can be inserted which carry a fluid with elevated temperature.

Especially preferably the line/lines are coolant lines and/or coolant hoses of the internal combustion engine. Heating of the components of the dosing system thus takes place preferably via coolant hoses which have been clipped in. In this way the exhaust heat of the internal combustion engine can be easily and advantageously used to heat the components of the dosing system. Alternatively or cumulatively the use of exhaust heat from system components such as pump or proportional control valve is also possible by heat transfer via the component carrier in order to heat the parts and components which carry the urea solution.

Especially preferably the component carrier consists of a metal or an alloy which has good heat conduction properties, especially aluminum or an aluminum alloy, and/or the component carrier is formed from a base plate, especially a plastic plate, which has a heat-conducting coating, especially is jacketed by an aluminum sheet.

The component carrier is preferably formed by a metal plate which has a lengthwise extension, the groove/grooves and/or receiver/receivers running along the plate so that a large contact region is formed. The heat transfer to the components to be heated can be optimized by a corresponding choice of a material with good heat conduction properties for the component carrier and an advantageous geometrical configuration of the contact region/regions.

Especially preferably the component carrier has a high coefficient of heat transfer at least in the region of the contact regions, especially of the groove/grooves and/or receiver/receivers. Preferably the component carrier has high thermal conductivity at least in the region of the contact regions, especially of the groove/grooves and/or receiver/receivers. In this way the heat transfer to the component carrier can be facilitated and optimized.

To improve heat transfer, additives such as contact gel or the like can be introduced into the contact region. Preferably the lines are clipped/can be clipped into grooves and/or receivers. This facilitates mounting and insertion of the lines for forming a heat-conductive connection between the lines and the component carrier.

Especially preferably the component carrier has mounting elements, especially dovetail-shaped elements, by means of which it can be mounted in the corresponding receivers, especially mounting elements of a damping material, especially rubber.

According to the advantageous embodiments of the present invention, a component carrier of a dosing system including a plurality of components for injecting a urea solution into the exhaust gas flow of an internal combustion engine including a coolant circuit for selective catalytic reduction, comprises a base plate forming the component carrier, a plurality of inner flow channels integrated into the base plate, and an inlet port and an outlet port connecting the inner flow channels with the coolant circuit of the internal combustion engine. The component carrier is heated by flowing a fluid having an elevated temperature and circulating in the coolant circuit from the inlet port to the outlet port passing through the inner flow channels and transferring the heat from the fluid to the component carrier. The components of the dosing system mounted on the component carrier and in thermal contact with the component carrier are heated by heat transfer from the heated component carrier.

By integrating the inner flow channels of the component carrier into the cooling circuit of the internal combustion engine, all components mounted on the component carrier will be heated automatically and evenly through heat transfer by contact. No heat conducting jacket for the component carrier or separate heating elements are needed in accordance with this embodiment of the invention. This simplifies maintenance procedures by making the components mounted on the component carrier easier accessible. By mounting the components of the dosing system on the component carrier and by heating those components through the component carrier by transferring heat from the engine coolant system via the component carrier to those components an advantage is reached over the known prior art by eliminating the need to surround the components of the dosing system with a housing, such as a box, and to heat the interior of the housing utilizing heating elements.

According to preferred embodiments of the present invention, the components of the dosing system mounted on the component carrier include a pump, an air valve, a nonreturn valve, a urea solution line, a compressed air line, at least one nozzle, and ports to the urea solution line, the compressed air line and the at least one nozzle.

According to preferred embodiments of the present invention, the component carrier forms a heat sink within the coolant circuit of the internal combustion engine.

According to preferred embodiments of the present invention, the base plate is made of a metal, alloy, or plastic material having good heat conducting properties.

According to preferred embodiments of the present invention, the base plate is a solid plate.

According to preferred embodiments of the present invention, the fluid is engine coolant.

According to preferred embodiments of the present invention, the inner flow channels are designed such that heat from the fluid is transferred to the component carrier.

According to preferred embodiments of the present invention, the inner flow channels are arranged in parallel.

According to preferred embodiments of the present invention, the inner flow channels are positioned at the top, the bottom or on either side of the component carrier.

According to preferred embodiments of the present invention, the components mounted on the component carrier are heated automatically through heat transfer by contact.

According to preferred embodiments of the present invention, the dosing system is connected to a urea tank from which urea solution can be taken, and wherein the dosing system is further connected to a compressed air supply.

According to preferred embodiments of the present invention, the dosing system includes a pump for delivering the urea solution and at least one nozzle through which the urea solution is injected into a exhaust gas flow of the internal combustion engine by means of compressed air.

According to preferred embodiments of the present invention, the component carrier has mounting elements of a vibration-damping material, and wherein the mounting elements are used to connect the component carrier with the urea tank.

According to preferred embodiments of the present invention, the components of the dosing system are pre-assembled to the component carrier prior to the installation of the component carrier in the urea tank.

According to the advantageous embodiments of the present invention, a dosing system for injecting a urea solution into the exhaust gas flow of an internal combustion engine including a coolant circuit for selective catalytic reduction is disclosed. The dosing system comprises a urea solution line that connects the dosing system with a urea tank, a compressed air line that connects the dosing system to a compressed air supply, a pump for retrieving the urea solution from the urea tank, at least one nozzle through which the urea solution can be injected into the exhaust gas flow utilizing compressed air from the compressed air supply, an air valve positioned in the compressed air line, a nonreturn valve positioned downstream of the pump, and a component carrier including a plurality of inner flow channels and an inlet port and an outlet port connecting the inner flow channels with the coolant circuit of the internal combustion engine. The urea solution line, the compressed air line, the pump, the at least one nozzle, the air valve and the nonreturn valve are mounted on the component carrier and in thermal contact with the component carrier.

According to preferred embodiments of the present invention, the component carrier is heated by flowing a fluid having an elevated temperature and circulating in the coolant circuit from the inlet port to the outlet port passing through the inner flow channels and transferring the heat from the fluid to the component carrier.

According to preferred embodiments of the present invention, the urea solution line, the compressed air line, the pump, the at least one nozzle, the air valve and the nonreturn valve are heated by heat transfer from the heated component carrier.

According to preferred embodiments of the present invention, the amount of compressed air, which is supplied for atomization of the urea solution, is controlled at each operating point depending on the operating parameters exhaust gas temperature and exhaust gas flow and is reduced to the minimum amount of air which is required at the time so that the droplet quality of the injected urea solution is sufficient for the action of the catalytic converter.

According to preferred embodiments of the present invention, the air valve is a proportional control valve enabling exact control of the amount of air that is supplied for injection of the urea solution into the exhaust gas flow.

According to the advantageous embodiments of the present invention, a method for controlling the injection of urea solution into the exhaust gas flow of an internal combustion engine including a coolant circuit for selective catalytic reduction is disclosed. The method comprises the steps of: connecting a component carrier including a plurality of inner flow channels and an inlet port and an outlet port connecting the inner flow channels with the coolant circuit of the internal combustion engine, mounting a plurality of components of a dosing system on the component carrier and in contact with the component carrier, wherein the components of the dosing system include an urea solution line, a compressed air line, a pump, at least one nozzle, an air valve and a nonreturn valve, heating the component carrier by flowing a fluid, which has an elevated temperature and circulates in the coolant circuit, from the inlet port to the outlet port thereby passing through the inner flow channels and transferring the heat from the fluid to the component carrier, heating the plurality of components of the dosing system by heat transfer from the heated component carrier, and forming with the component carrier a heat sink within the coolant circuit of the internal combustion engine.

In this way simple and prompt mounting of the component carrier or of the pre-mounted module consisting of the component carrier and the components mounted thereon is possible when the dosing system is being installed. Preferably the dosing system is located on the urea solution tank. For this purpose the urea tank has corresponding dovetail grooves into which the dovetail elements of the component carrier are inserted. Preferably the mounting elements which are located on the component carrier consist of a vibration-damping material such as rubber or the like so that vibrations are not transferred so that decoupling of the pump and tank is enabled.

In the systems currently being used in motor vehicles compressed air and urea are combined in a mixing chamber and injected into the exhaust gas via a single perforated nozzle. The air mass flow is set here to a constant value in order to prevent backflow of the urea into the air flow upstream of the mixing chamber. In this way a defined boundary between urea-carrying regions and urea-free regions is constituted and urea crystal formation in the mixing system is avoided. Regions in the dosing system which urea enters only temporarily must be avoided since there is the danger that the aqueous urea solution will dry, the urea will form crystals and clog the air channels or urea channels.

Here the tendency to clogging as a result of crystal formation by urea is disadvantageous. These crystals can be dissolved again by means of liquid urea. But at least temporary clogging of the system cannot be avoided.

Commercial vehicles generally have a compressed air system for the braking system and some additional consumers. The air pressure of the systems is generally above 10 bar. In the known systems the compressed air of these compressed air systems of commercial vehicles is likewise used for atomization or injection of the urea by means of the known dosing systems. But the disadvantage is that the continuous air consumption of the dosing system causes higher fuel consumption by the engine. It is likewise disadvantageous that the air supply must be matched to the additional consumers in the form of the urea dosing system. Here it is especially disadvantageous that compressors with increased performance often become necessary.

Preferably the air pressure of the compressed air supply is monitored and controlled according to requirements in the dosing system as claimed in the invention for injection of a urea solution into the exhaust gas flow. In the method for controlling the injection of a urea solution by means of compressed air into the exhaust gas flow of an internal combustion engine for selective catalytic reduction, it is especially advantageous that the amount of compressed air which is supplied for atomization of the urea solution is controlled at each operating point depending on the operating parameters exhaust gas temperature and exhaust gas flow and is reduced to the minimum amount of air which is required at the time so that the droplet quality of the injected urea solution is sufficient for the action of the catalytic converter.

In the dosing system as claimed in the invention and the method for controlling the injection of the urea solution the compressed air is supplied controlled via a corresponding control valve. The supplied amount of air is reduced at each operating point to such an extent that the droplet quality is still sufficient for the action of the catalytic converter. This takes place by adapting the amount of compressed air at each operating point of the engine depending on the operating parameters: As operating parameters especially the exhaust gas temperature and/or the exhaust gas mass flow are detected and supplied to the control of the amount of air, i.e. that the amount of air is tracked depending on the current engine operating points.

A reduction in the amount of air in the nozzle means a deterioration of the droplet quality, i.e. larger droplet diameter. The minimally required droplet quality is dependent on the efficiency of the catalytic converter required at the respective operating point. The amount of compressed air is reduced to the required minimum according to the respective requirement. Preferably the air valve is a proportional control valve. By using a proportional control valve it is possible to exactly control the amount of air of the compressed air supply, i.e. the amount of air which is supplied for injection of the urea solution into the exhaust gas flow. Preferably the sensor which is located between the air valve and the nozzle is a pressure sensor by means of which the pressure in the compressed air system downstream of the air valve is monitored.

In one especially preferred embodiment the dosing system receives a signal of the exhaust gas mass flow from the engine control. The exhaust gas mass flow is computed by the engine control device from the intaken air mass flow and the fuel mass flow and is made available as a signal of the exhaust gas mass flow. Alternatively the dosing system has a sensor for measuring the exhaust gas mass flow. Preferably the dosing system alternatively or cumulatively has a sensor for measuring the exhaust gas temperature.

From the exhaust gas mass flow signal and/or the exhaust gas temperature it is possible to detect the operating parameters exhaust gas temperature and/or the exhaust gas mass flow which are dependent on the respective engine operating point and to evaluate them via corresponding control electronics of the dosing system and to control the pressure and/or amount of air and/or valve opening times of the compressed air supply depending on the measured operating parameters.

The variables for matching the dosing of the amount of air are especially the following:
  exhaust gas temperature
  exhaust gas mass flow
  urea mass flow
  required catalytic converter efficiency
  catalytic converter size
  treatment distance between urea injection and catalytic converter It is thus possible with the dosing system as claimed in the invention to optimize the amount of air at any individual operating point depending on the respective boundary conditions.

In one especially preferred embodiment the compressed air supply has a throttle valve. The arrangement of a throttle valve makes it possible to reduce the air pressure accordingly in the compressed air system before feed to the nozzle.

In one especially preferred embodiment the dosing system has a dosing pump for delivery of the urea solution. In particular this dosing pump can be a controllable dosing pump with respect to the delivered mass flow of urea solution so that the delivery amount of urea solution can be matched to the respective operating state by corresponding triggering of the dosing pump.

Preferably there is a connecting line between the urea line and a line of the compressed air supply, the connecting line having a nonreturn valve. In order to completely interrupt the air supply in dosing pauses, it is necessary to remove the urea from the hot regions in order to avoid formation of deposits. Otherwise the urea would decompose at high temperatures and lead to deposits and thus to clogging. The arrangement of a compressed air line, i.e. a connecting line between a urea line and a line of the compressed air supply, can prevent these deposits by the urea line being blown clear by means of compressed air in dosing pauses. A nonreturn valve is inserted into this connecting line and its opening pressure is above the air pressure which is established during dosing downstream of the air valve.

In dosing operation this nonreturn valve is closed since the pressure in the compressed air line is below the opening pressure of the nonreturn valve. In order to blow the urea line clear with compressed air, the delivery of urea by the dosing pump is shut off and the air valve is briefly opened to such an extent that the pressure rises above the opening pressure of the nonreturn valve. Following the throttle in the compressed air line a pressure drop occurs in the dosing line and the compressed air drives the urea into the exhaust gas system. The line is thus blown clear. After a brief air blast the urea is blown out of the dosing nozzle and the air supply can be completely shut off.

Preferably the dosing system has a compressed air compressor. This compressed air compressor makes it possible to make available the compressed air which is delivered for the dosing system if there is no compressed air supply or insufficient compressed air supply in the installation vicinity of the dosing system.

Preferably the dosing system has a control device by means of which the air valve and/or throttle valve and/or a dosing pump and/or a compressed air compressor can be controlled depending on the measured values which have been detected by the sensor or the sensors.

Optimization of the operation of the dosing system, i.e. air optimization, can be implemented in an especially advantageous manner by the arrangement of this control device which controls one or more components of the dosing system depending on the sensor measured valves, i.e. depending on the current operating parameters. By means of this control device it is thus possible to optimally adapt the delivery amount of urea solution and the delivery amount of air to the current operating parameters of the internal combustion engine and of the catalytic converter for selective catalytic reduction and thus to control them.

Preferably the dosing system has a urea solution tank. Because the dosing system itself has a urea solution tank, it is possible to retrofit the dosing system in corresponding environments in which there is not already a urea solution tank. In one preferred embodiment the dosing system has a binary nozzle. Especially preferably the binary nozzle is an outer mixing nozzle.

The method as claimed in the invention for control of the injection of a urea solution by means of compressed air in the exhaust gas flow of an internal combustion engine for selective catalytic reduction is preferably configured such that when the injection of urea solution is interrupted or ended the urea solution is removed from the lines which carry the urea solution by means of compressed air.

The method is therefore preferably configured such that termination or interruption of the delivery of urea solution takes place in time prior to termination or interruption of the compressed air delivery and the compressed air after interruption or termination of the delivery of urea solution is used to clean the parts which carry urea solution by means of compressed air. In this way the urea is removed especially from the hot regions of the dosing system. Otherwise the urea would decompose at high temperatures and deposits would form and could lead to clogging.

In order to blow the urea line clear with compressed air, urea delivery is shut off by the dosing pump and the air control valve is briefly opened such that the pressure rises over the opening pressure of a nonreturn valve in a connecting line between the urea line and compressed air line. As a result a pressure drop occurs in the dosing line so that the compressed air drives the urea into the exhaust gas system and thus the urea-carrying line is blown clear. After a brief air blast the urea is blown out of the dosing nozzle and the air supply can likewise be completely shut off.

Interruption or termination of the injection of urea solution can thus take place by shutting off the dosing pump. Before turning on the dosing again, it is useful to first set the compressed air to a value which is above the normal dosing air supply in order to cool the nozzle before the urea enters it.

Blowing the urea out of the lines is likewise advantageous when the entire system is turned off. Urea freezes at temperatures below −11° Celsius. In doing so the urea water solution expands by roughly 10%. This leads to a frost pressure by which components could be destroyed. Therefore it is necessary to blow the urea out of the nozzle before the system is completely shut off. This can take place especially by the entire system being cleaned by means of compressed air after completion of urea delivery, i.e. by the urea being blown out of the system by means of compressed air.

Preferably triggering of at least one dosing pump and/or at least one compressed air compressor and/or at least one air control valve takes place depending on the operating parameters exhaust gas temperature and exhaust gas mass flow in the method as claimed in the invention for controlling the injection of the urea solution. For this purpose, by means of a corresponding control device the differently acquired operating parameters can be evaluated so that the components can be exactly triggered.

The figures show a schematic of a dosing system for injection of a urea solution into the exhaust gas flow of an internal combustion engine and one exemplary embodiment of the component carrier as claimed in the invention; they are explained below.

Figure 1:
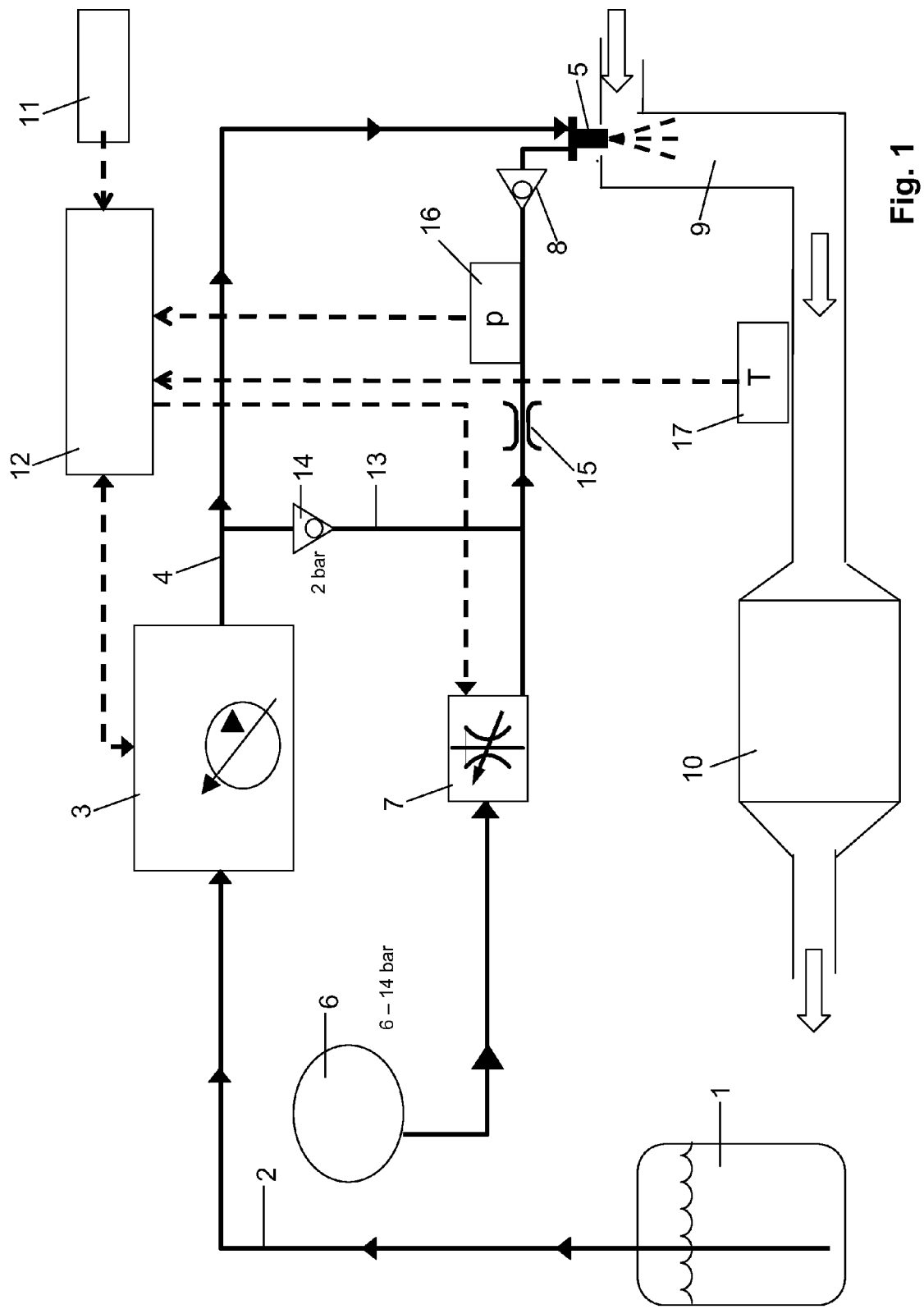
FIG. 1 shows a diagram of the arrangement of one embodiment of a dosing system.
Figure 2:
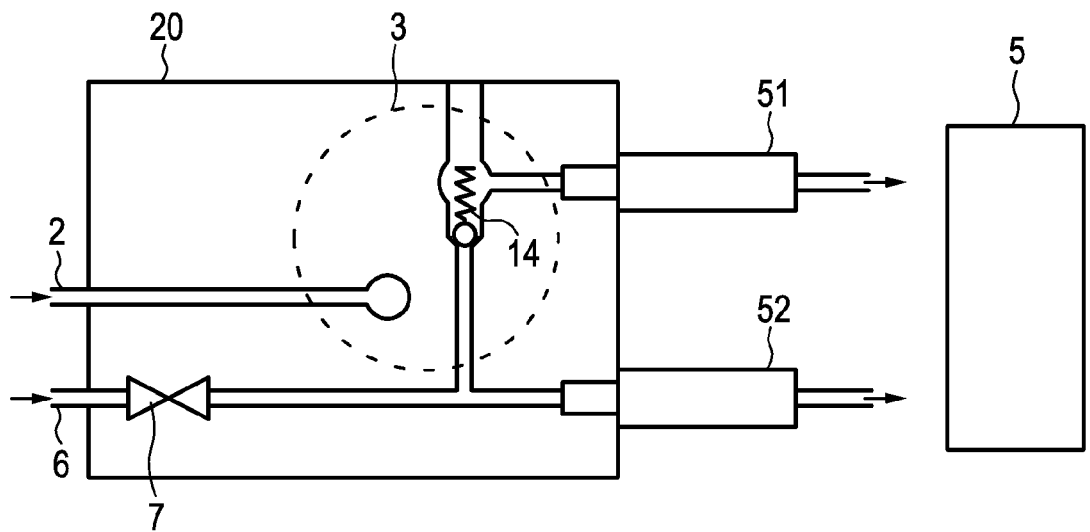
FIG. 2 shows one embodiment of a component carrier as claimed in the invention.
Figure 2:
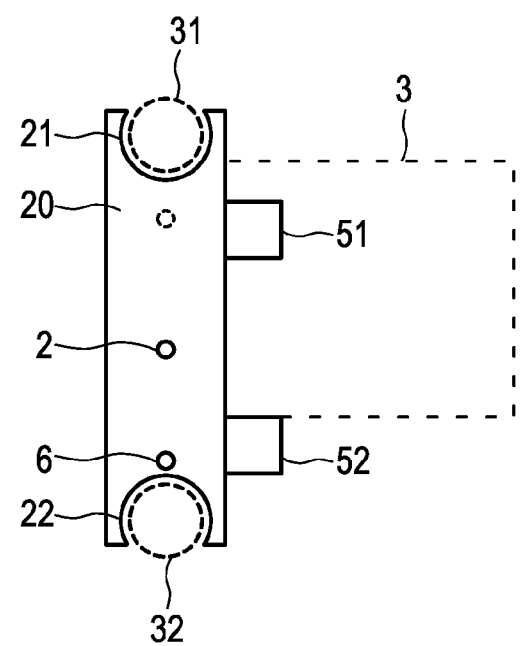
Figure 3:
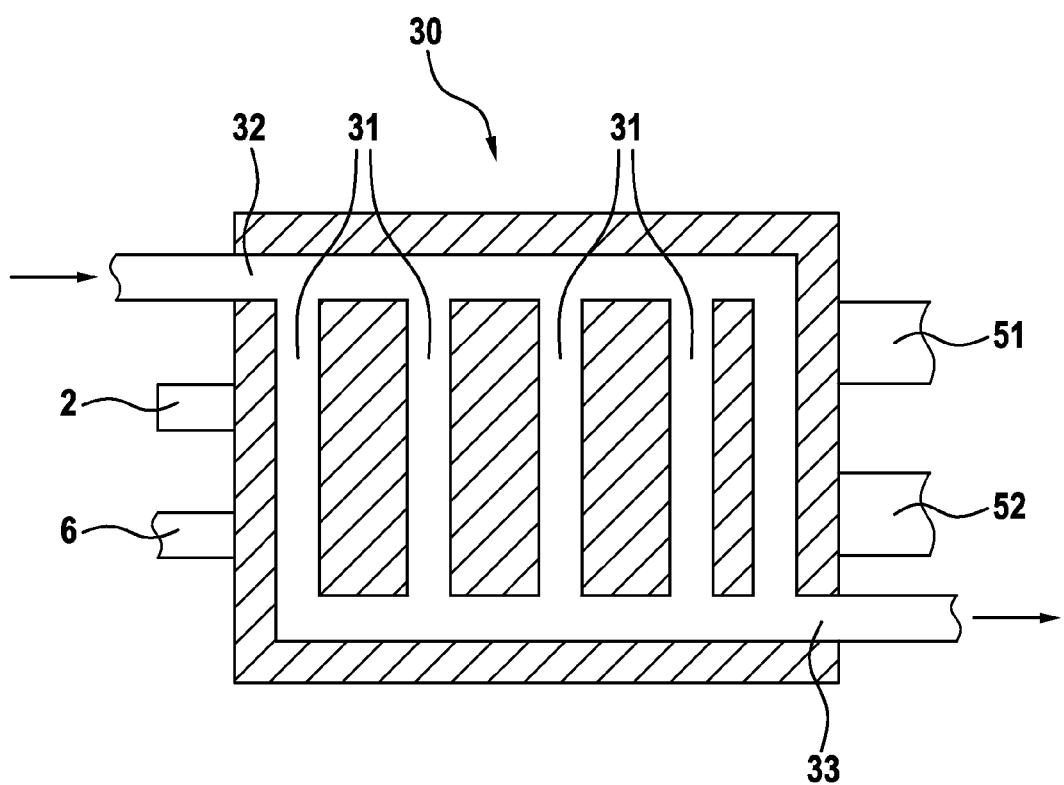
FIG. 3 shows another embodiment of the component carrier of the invention.

In the figures identical components and assemblies are labeled with identical reference numbers. FIG. 1 schematically shows a urea dosing system. FIG. 2 shows one embodiment of a component carrier as claimed in the invention in a top view (top) and a side view turned by 90° (bottom). FIG. 3 shows another embodiment of the component carrier of the invention in a cross-sectional top view.

Urea is sucked out of a tank 1 via an intake line 2 by the dosing pump 3. The dosing pump 3 is for example a membrane pump or a piston pump which with each stroke delivers a defined amount of urea solution and thus uniformly doses it. The urea is routed to a binary nozzle 5 via a pressure line 4. The binary nozzle 5 is preferably an outer mixing nozzle in which an air jet atomizes the urea.

Compressed air is routed from a compressed air tank 6 to a proportional air valve 7. The proportional air valve 7 sets the pressure flow to a value dictated by the electronics 12. Input quantities for computing this value by means of the electronic control unit 12 are engine data such as the exhaust gas mass flow which are transferred from the engine electronics. Furthermore the exhaust gas temperature and the pressure of the compressed air upstream of the binary nozzle 5 [sic]. The pressure upstream of the binary nozzle 5 is a measurement of the volumetric air flow which has passed. The air is routed via a compressed air line and a nonreturn valve 8 to the binary nozzle 5. The urea is atomized in the binary nozzle 5 by the compressed air and supplied to the exhaust gas flow 9.

To detect the operating parameters exhaust gas flow, air pressure and exhaust gas temperature, there are a sensor 11 for detecting the exhaust gas mass flow, a pressure sensor 16 for detecting the pressure of the compressed air upstream of the binary nozzle 5, and a temperature sensor 17 for detecting the exhaust gas temperature in the exhaust gas flow 9. In one alternative which is not shown the exhaust gas mass flow signal is made available by the engine control.

The measured values of the sensors 11, 16, 17 are supplied to the control unit 12. In the control unit 12 the detected sensor data and engine data are evaluated and triggering of the proportional air valve 7 and dosing pump 3 takes place depending on the instantaneous operating data. The tip of the binary nozzle 5 is located in the exhaust gas flow 9. The urea is routed to the SCR catalytic converter 10 via the exhaust gas line. In doing so a large part of the liquid droplets vaporizes. The urea is converted into ammonia. In the catalytic converter 10 itself the nitrogen oxide emission of the engine is reduced with the ammonia.

The nonreturn valve 8 in the pressure line between the proportional air valve 7 and binary nozzle 5 prevents the urea from being forced into the compressed air line in possible clogs of the nozzle 5.

The compressed air line downstream of the proportional air valve 7 is connected with the urea line 4 via a spring-loaded nonreturn valve 14 to the line 13. Furthermore a flow throttle 15 is installed in the compressed air line downstream of the proportional compressed air valve 7 and downstream of the branch of the line 13. In this way it is easily possible without additional actively actuated components to expel the urea from the pressure line and the nozzle using compressed air in order to remove the urea from hot regions in the dosing pauses in order to prevent the urea from decomposing at high temperatures and forming deposits.

Operation of the flow throttle 15 in the simplest case can be assumed by the line itself if it is long enough. During dosing operation the pressure in the line from the throttle 15 is below the opening pressure of the spring-loaded nonreturn valve 14. The compressed air flows through the nozzle 5. In this case the charged urea is atomized. If with the dosing pump 3 turned off the pressure downstream of the proportional pressure valve 7 is raised to a value above the opening pressure of the nonreturn valve 14, air flows into the pressure line 4 of the urea. The urea in the line 4 and nozzle 5 is expelled. With this the region of the nozzle 5 after the engine is shut off is free of urea and thus resistant to freezing. Deposits cannot form in engine operation at high exhaust gas temperatures without dosing.

The pump 3, the proportional air valve 7 and the nonreturn valve 14 of the dosing system as shown in FIG. 1 are arranged on the component carrier 20 as shown in FIG. 2. The component carrier 20 integrates on the one hand ports for the urea line 2 and the compressed air line 6, on the other hand the ports 51, 52 to the nozzle 5, and within the component carrier 20 the corresponding lines themselves. Via the port 51 the heated urea solution delivered by the pump 3 is fed to the nozzle 5. Compressed air is fed to the nozzle 5 via the port 52.

Between the pressure side of the pump 3 and the compressed air supply there is the spring-loaded nonreturn valve 14.

The component carrier 20 is formed by a solid plastic plate which is completely jacketed by a heat-conducing aluminum sheet. Along its lengthwise edges the plate has recesses 21, 22. The heat-conductive aluminum jacketing completely surrounds the component carrier 20 including the recesses 21, 22. Coolant hoses 31, 32 of the internal combustion engine are clipped into these recesses 21, 22. The component carrier 20 thus forms a heat sink within the coolant circuit of the internal combustion engine. The components, i.e. the pump 3, the valves 7, 14 and the port regions 51, 52 of the dosing system which are located on the component carrier 20 are heated by way of the heat which has been transferred on this path from the coolant hoses 31, 32 via the contact regions 21, 22 to the component carrier 20.

Alternatively, as illustrated in FIG. 3, a component carrier 30 is formed by a solid base plate including a plurality of integrated inner flow channels 31. The base plate may be made of a metal, alloy, or plastic material having good heat conducting properties. The flow channels 31 may be connected to the cooling circuit of the internal combustion engine via an inlet port 32 and an outlet port 33. A fluid having an elevated temperature, such as hot engine coolant may flow from the inlet port 32 to the outlet port 33 by passing thorough the inner flow channels 31. The inner flow channels 31 are preferably designed such that heat from the coolant is transferred to the component carrier 30. By heating the component carrier 30, the components mounted on the component carrier 30, including the pump 3, the proportional air valve 7, and the nonreturn valve 14 of the dosing system as shown in FIG. 1, will be heated through heat transfer by contact as well. Furthermore, the into the component carrier 30 integrated ports for the urea solution line 2 and the compressed air line 6, the ports 51, 52 to the binary nozzle 5, as well as the corresponding connecting lines within the component carrier 30 will also be heated by heat transferred from the component carrier 30. The component carrier 30 thus forms a heat sink within the coolant circuit of the internal combustion engine.

In accordance with a preferred embodiment of the invention, the inner flow channels 31 may be arranged in parallel. Other configurations may be possible. The inner flow channels 31 may be in accordance with preferred embodiments of the invention positioned at the top, the bottom or on either side of the component carrier 30.

By integrating the inner flow channels 31 of the component carrier 30 into the cooling circuit of the internal combustion engine, all components mounted on the component carrier 30 will be heated automatically and evenly through heat transfer by contact. No heat conducting jacket or separate heating elements are needed in accordance with this embodiment of the invention. This simplifies maintenance procedures by making the components mounted on the component carrier 30 easier accessible.

The arrangement of the component carrier 20 or 30 in accordance with preferred embodiments of the invention reduces the mounting effort for the dosing system. Various ports and lines are eliminated since they are integrated into the component carrier 20 or 30. At the same time the system becomes more reliable due to fewer possible leak sites such as hose connections and hose ports. Forces would act on these hose connections and hose ports in a discrete structure of the system by different vibrations/movement of the components to one another. These vibrations/movements of the components to one another are however prevented by the arrangement of the components on the component carrier.

The integration of the nonreturn valve 14 into the plate of the component carrier 20 or 30 takes place in a position in which the spring of the nonreturn valve 14 is continuously flushed with fresh urea during dosing. After shutting off the dosing and the subsequent ventilation by the nonreturn valve 14 the spring which is already wetted with urea can "set up/stick" (for example overnight) by the urea crystallizing out. This flushing by the special positioning of the nonreturn valve 14 dissolves the dried urea again in the next dosing and transports it away to the nozzle 5. Thus the nonreturn valve 14 can be used again after a short dosing time.

Simple heating of the components and their connections among one another takes place. In accordance with an advantageous embodiment of the invention, the component carrier 20 on the sides is made such that hoses 31, 32 can be inserted into a round groove 21, 22. These hoses 31, 32 are supplied with coolant from the vehicle. The hoses 31, 32 could be positively forced into the grooves 21, 22 by a cover sheet/housing and the components of the dosing system are protected from the outside against dirt and the action of a force.

In accordance with a further advantageous embodiment of the invention, the component carrier 30 is integrated into the cooling circuit of the internal combustion engine just like a radiator. The component carrier 30 includes a plurality of inner flow channels 31 through which the hot coolant flows from an inlet port 32 to an outlet port 33. The inlet port 32 and the outlet port 33 are connected with the cooling circuit of the internal combustion engine.

Accordingly, the component carrier 20 or 30 heats all the components, which include the pump 3, the proportional air valve 7 and the nonreturn valve 14, the urea solution line 2, the compressed air line 6, and the binary nozzle 5, located on it and the connecting ports for the urea solution line 2 and the compressed air line 6, as well as the ports 51, 52 to the binary nozzle 5. At the same time however excess exhaust heat of the dosing pump 3 is released to the component carrier 20. For the component proportional valve 14 icing by humid air as a result of pressure relief can no longer arise either.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:
1. A component carrier of a dosing system including a plurality of components for injecting a urea solution into the exhaust gas flow of an internal combustion engine including a coolant circuit for selective catalytic reduction, comprising:
   a base plate forming the component carrier; a plurality of inner flow channels integrated into the base plate; and an inlet port and an outlet port connecting the inner flow channels with the coolant circuit of the internal combustion engine;
   wherein the component carrier is heated by flowing a fluid having an elevated temperature and circulating in the coolant circuit from the inlet port to the outlet port passing through the inner flow channels and transferring the heat from the fluid to the component carrier; and wherein the components of the dosing system mounted on the component carrier and in thermal contact with the component carrier are heated through heat transfer from the heated component carrier by contact;
   wherein a compressed air line and an air valve are mounted on the component carrier and in thermal contact with the component carrier and are heated through heat transfer from the heated component carrier by contact.
2. The component carrier of claim 1, wherein the components of the dosing system mounted on the component carrier further include a pump, a nonreturn valve, a urea solution line, at least one nozzle, and ports to the urea solution line.
3. The component carrier of claim 1, wherein the component carrier forms a heat sink within the coolant circuit of the internal combustion engine.
4. The component carrier of claim 1, wherein the base plate is made of a metal, alloy, or plastic material having good heat conducting properties.
5. The component carrier of claim 1, wherein the base plate is a solid plate.
6. The component carrier of claim 1, wherein the fluid is engine coolant.
7. The component carrier of claim 1, wherein the inner flow channels are designed such that heat from the fluid is transferred to the component carrier.
8. The component carrier of claim 1, wherein the inner flow channels are arranged in parallel.
9. The component carrier of claim 1, wherein the inner flow channels are positioned at the top, the bottom or on either side of the component carrier.
10. The component carrier of claim 1, wherein the components mounted on the component carrier are heated automatically through heat transfer by contact.
11. The component carrier of claim 1, wherein the dosing system is connected to a urea tank from which urea solution can be taken, and wherein the dosing system is further connected to a compressed air supply.
12. The component carrier of claim 11, wherein the dosing system includes a pump for delivering the urea solution and at least one nozzle through which the urea solution is injected into an exhaust gas flow of the internal combustion engine by means of compressed air.
13. The component carrier of claim 11, wherein the component carrier has mounting elements of a vibration-damping material, and wherein the mounting elements are used to connect the component carrier with the urea tank.
14. The component carrier of claim 11, wherein the components of the dosing system are pre-assembled to the component carrier prior to the installation of the component carrier in the urea tank.
15. A dosing system for injecting a urea solution into the exhaust gas flow of an internal combustion engine including a coolant circuit for selective catalytic reduction, the dosing system comprising:
   a urea solution line that connects the dosing system with a urea tank;
   a compressed air line that connects the dosing system to a compressed air supply;
   a pump for retrieving the urea solution from the urea tank;
   at least one nozzle through which the urea solution can be injected into the exhaust gas flow utilizing compressed air from the compressed air supply;
   an air valve positioned in the compressed air line;
   a nonreturn valve positioned downstream of the pump; and
   a component carrier including a plurality of inner flow channels and an inlet port and an outlet port connecting the inner flow channels with the coolant circuit of the internal combustion engine;
   wherein the urea solution line, the compressed air line, the pump, the at least one nozzle, the air valve and the nonreturn valve are mounted on the component carrier and in thermal contact with the component carrier.
16. The dosing system of claim 15, wherein the component carrier is heated by flowing a fluid having an elevated temperature and circulating in the coolant circuit from the inlet port to the outlet port passing through the inner flow channels and transferring the heat from the fluid to the component carrier.
17. The dosing system of claim 15, wherein the urea solution line, the compressed air line, the pump, the at least one nozzle, the air valve and the nonreturn valve are heated through heat transfer from the heated component carrier by contact.
18. The dosing system of claim 15, wherein the amount of compressed air, which is supplied for atomization of the urea solution, is controlled at each operating point depending on the operating parameters exhaust gas temperature and exhaust gas flow and is reduced to the minimum amount of air which is required at the time so that the droplet quality of the injected urea solution is sufficient for the action of the catalytic converter.
19. The dosing system of claim 15, wherein the air valve is a proportional control valve enabling exact control of the amount of air that is supplied for injection of the urea solution into the exhaust gas flow.
20. A method for controlling the injection of urea solution into the exhaust gas flow of an internal combustion engine including a coolant circuit for selective catalytic reduction, the method comprising the steps of:
   connecting a component carrier including a plurality of inner flow channels and an inlet port and an outlet port connecting the inner flow channels with the coolant circuit of the internal combustion engine;
   mounting a plurality of components of a dosing system on the component carrier and in contact with the component carrier, wherein the components of the dosing system include an urea solution line, a compressed air line, a pump, at least one nozzle, an air valve and a nonreturn valve;

heating the component carrier by flowing a fluid, which has an elevated temperature and circulates in the coolant circuit, from the inlet port to the outlet port thereby passing through the inner flow channels and transferring the heat from the fluid to the component carrier;
heating the plurality of components of the dosing system through heat transfer from the heated component carrier by contact; and
forming with the component carrier a heat sink within the coolant circuit of the internal combustion engine.

* * * * *